UNITED STATES PATENT OFFICE.

MORGAN W. BROWN, OF NEW YORK, N. Y.

IMPROVED PROCESS FOR GILDING AND ORNAMENTING SURFACES.

Specification forming part of Letters Patent No. 52,673, dated February 20, 1866.

*To all whom it may concern:*

Be it known that I, MORGAN W. BROWN, of New York, in the county and State of New York, have invented a new Mode or Process for Gilding, Bronzing, and Ornamenting the Surfaces of Wood, Stone, Glass, Cloth, Metals, &c.; and I do hereby declare that the following is a full and exact description thereof.

The nature of my invention consists in the application of an alkaline silicate of from about 15° to 25° Baumé to the surfaces of wood, paper, glass, metals, &c., with a brush or by immersion. The alkaline silicate I use is that usually made with a large excess of flint or quartz sand, and this soluble alkaline silicate I prepare, before using it, by treating it with a small proportion of a metallic or earthy oxide, to render the alkaline silicate superior in its applications. I also use in the alkaline silicate from ten to fifteen per cent. of glycerine of specific gravity 10° or 12° Baumé for the purpose of preventing its drying too rapidly. After the aforesaid application of this prepared silicate to the surfaces aforesaid, and before it becomes dry, and while it is wet, I apply the gilt, bronzes, and other powdered metals, as iron, steel, lead, &c., to the surfaces coated previously, either in the dry state or moistened up with the prepared alkaline silicate, and applied with a brush in the manner of a paint. I use also an after-application of the prepared silicate as a varnish-coating.

I use to all substances composed of glass, porcelain, stone, metals, &c., a heat of 150° to 200° Fahrenheit, after the coatings of bronzes, &c., are thoroughly dry, for the purpose of rendering the same more firm. For bronzing, gilding, and ornamenting wood, paper, thread, cloth, and fibrous substances, no artificial heat is necessary. I use also oil, resinous or spirit varnishes, as well as plain and colored lacquers, over the surfaces of gilding, bronzing, &c.

To enable others skilled in the art to make and use my invention, I will proceed to describe the mode and process of application, &c.

First prepare a strongly silicious alkaline silicate (soluble glass) by heating it in any suitable vessel to the boiling-point. Then add from one to two per cent. of oxide of zinc, lead, or other metallic or earthy oxides in powdered form. Then stir it well, and when settled it should have a milky or whitish appearance, and mark from 20° to 25° Baumé when cold. I use this solution from 10° to 15° also (as the application and uses may require,) to a good advantage.

In coating over large surfaces of wood, paper, cloth, or metals, I use glycerine mixed with the prepared alkaline silicates while hot, to prevent its drying or setting too rapidly. I use from three to ten, or even fifteen, per cent. of pure glycerine, diluted previously to from 5° to 12° Baumé. I can also use molasses or any of the sirups of sugar in solution for the same purpose; but I do prefer the use of glycerine, as herein described. This alkaline silicate thus prepared can be used to the surfaces warm, but I prefer to use it cold.

Second. I now apply this prepared alkaline silicate, with a brush or by a bath, to the surfaces of substances to be gilded, bronzed, or covered with any metal in a fine form, or for ornamenting or embellishing, or for coating over painted, enameled, or plastered surfaces.

Third. I now apply the bronze, gilt, or other metallic powders over the prepared alkaline silicate in a dry form (or previously wet or moistened with the aforesaid alkaline silicate) with a brush or otherwise. This is to be done immediately after the solution aforesaid is applied and before it becomes dry, so that it spreads on smoothly like a coating of paint, and in the event of giving the surface of the substance coated a heavier coating I repeat it by one more application. After this is completed and becomes dry I use, to gloss or varnish it, a coating of the prepared alkaline silicate with good effect. I can also use any of the oil or spirit varnishes over this process of bronzing, and do use it, as also the colored lacquer-varnishes, for various ornamental uses.

Fourth. I use a heat of from 100° to 200° Fahrenheit on substances of a nature to resist heat, as glass, stone, and metals, after the same are finished, for the purpose of indurating; but in most uses I find it entirely unnecessary to use any artificial heat.

I find by practical tests that my mode or process for applying this art, as well as the materials used, are much more economical than the older methods of applying the same art; also, that the work executed by this process is more firm and durable, as well as highly ornamental. Besides, it resists fire, water, and moisture much better, and is not affected by the action of coal-gas, and is less liable to injury from acids or tarnish by oxidation.

The number and variety of articles that I have experimented on with this process are very great—its application to cloth and thread of cotton, silk, and linen, also to all articles produced from wood, paper, glass, stone, and metallic substances, crockery, porcelain, &c. I claim its use and application as highly important and valuable.

I am aware that an alkaline silicate has long been in use for purposes of painting and varnishing substances; also, that gilding, bronzing, and lacquer-varnish for all ornamental uses in coating and covering every variety of substance is old. Consequently I do not claim the use or application of them as new.

What I do claim as my invention is—

1. The mode or process of preparing an alkaline silicate preparatory to its use and application, and for the purposes of gilding, bronzing, &c., substantially as herein described.

2. The mode or process of applying the solution of prepared alkaline silicate and the gilt, bronze, and other metallic powdered substances to surfaces, in the manner and for purposes substantially as described.

3. The use and application of certain specified degrees of heat, for the purposes substantially as set forth.

4. The use and application to my mode or process of varnishes and lacquers, for purposes substantially as described.

MORGAN W. BROWN.

Witnesses:
JAMES T. GRAHAM,
M. M. LIVINGSTON.